Figure 1:
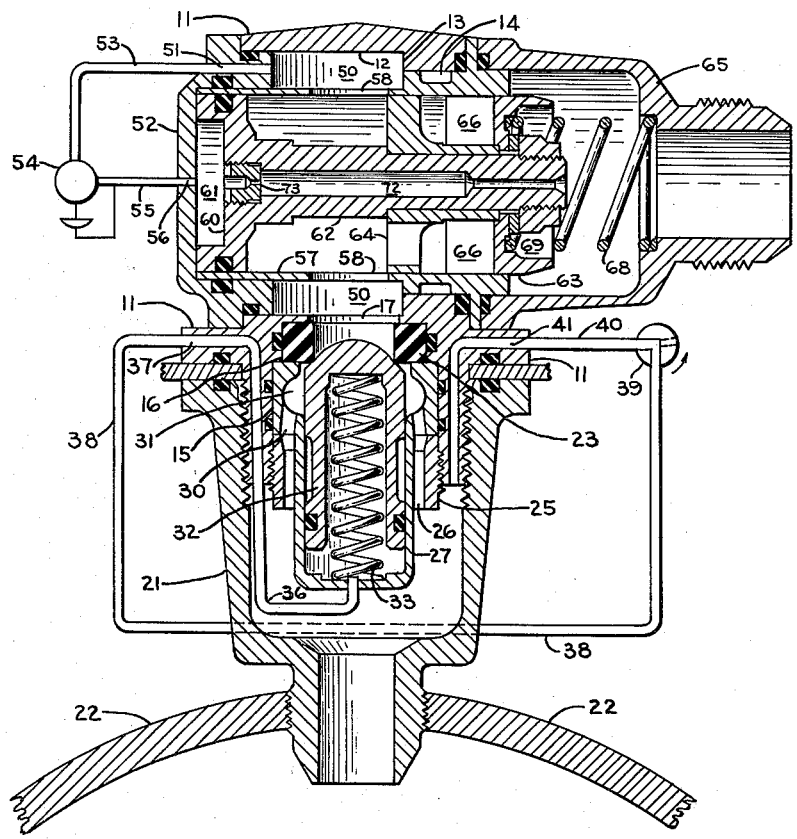

June 20, 1961  A. J. PERLE  2,989,067
COMBINATION AIR SHUT-OFF AND PRESSURE CONTROL VALVE
Filed Feb. 11, 1957

*INVENTOR.*
ABE J. PERLE
BY
*Robert W. Ely*
ATTORNEY 2,989,067
Patented June 20, 1961

1

2,989,067
COMBINATION AIR SHUT-OFF AND PRESSURE CONTROL VALVE
Abe J. Perle, Verona, N.J., assignor to The Bendix Corporation, a corporation of Delaware
Filed Feb. 11, 1957, Ser. No. 639,565
2 Claims. (Cl. 137—219)

The present invention relates to the flow control of a gas, such as air, and more particularly concerns a pilot-controlled high capacity shut-off valve.

Fuel air combustion turbine starters for aircraft jet engines require rapid on-off control of a supply of high pressure air from an air bottle. Starting is normally achieved very rapidly and hence improvements are desired in the capacity and the speed of the on-off function. A compact valve package of reduced size and weight adapted to be mounted by a single fitting on an air bottle is also desirable.

An object of the present invention is to provide a compact structure of reduced weight giving remote on-off snap action control of a large, high pressure gas flow.

A further object is the provision of an improved pilot-controlled high capacity shut-off valve structure for use with a pressure regulator.

A further object is the provision of an improved poppet-type shut-off valve which is opened by the force of high pressure gas on a top peripheral part of the rounded head of a valve member and which has a kidney-shaped annular recess cooperating with the rounded head to give large non-turbulent flow passages.

The accomplishment of the above objects and others, along with the advantages of the present invention, will be apparent from the following description and drawings.

Figure 2:
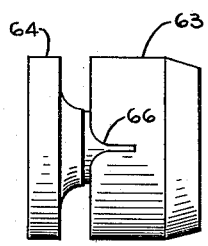

In the drawings:

FIG. 1 is a partially schematic and cross-sectional view of a high pressure gas system which includes the present inventive poppet-type on-off valve as used with a constant pressure reducing valve; and FIG. 2 is a plane view of the movable valve element of the pressure regulator and illustrates the configuration of the gas regulating slots.

As shown in the FIG. 1, body 11 is comprised of an upper part, partially housing a regulating valve, and a lower part, partially housing a shut-off valve. The upper part has a first circular channel or bore 12 which extends horizontally and terminates at the right at shoulder 13. A second smaller circular channel or bore 14 extends from this shoulder to the right end of body 11. The lower vertically-extending part of the body element has an outer bottom circular bore 15 and an inner shorter bore or annular recess 16 for a valve seat. Upper bore 12 is connected to the interior of the lower part by a short inner passageway or bore 17 in a thin wall section of the body. Upper bores 12, 14 are thus arranged perpendicularly with respect to the interior gas passages within the lower part of the valve body 11. Upper bore 12 forms the outer wall of a distributing annulus (hereinafter described) which passes air from the shut-off valve to the regulator.

The forged light weight aluminum body 11 is exteriorly threaded at its lower extremity and threaded into the top of a tubular member 21. Member 21 is threaded at its reduced lower end into a fixed-volume source of high pressure air, such as the high pressure air bottle 22, which is partially illustrated.

An annular valve seat 23 of hard plastic such as nylon and of rectangular cross-section is retained and suitably sealed in recess 16 of the body. An annular retainer 25 having bore 26 threads into the bottom bore 15 of body and retains steel valve guide 27 having circular guide cavity in the bore 15 of body against outer part of valve

2 seat 23. The wider upper wall or the inner large cylindrical part of hollow valve guide 27 has four equispaced passages 30 and a kidney-shaped annular recess 31 for passing air from the interior of tubular member 21 through bore 26 of the retainer to the shut-off valve formed by aluminum valve member 32 and seat 23. It is to be noted that the annular peripheral part of the rounded top of tubular valve member 32 is subject to high pressure air because the upper part of the kidney-shaped recess opens into a space which is over the outer periphery of the rounded top of the valve member 32 and below the inner edge of the valve seat. When spring 33, extending between the top of the cavity in valve member 32 and the bottom of the interior of the valve guide 27, is depressed and the valve member slides downwardly in the guide cavity, due to the force being exerted on the top periphery of valve member 32, it is apparent that a relatively-large passageway exists between the surfaces of the kidney-shaped recess and the top edge of the valve member and provide a nonturbulent flow. Leakage between the aluminum valve member 32 and the closed, cup-like valve guide 27 is prevented by the O-ring seal retained in the valve member.

The shut-off valve is normally closed due to the larger bottom surfaces of valve member being subjected to the same pressure as the smaller top periphery of the valve member. This pressurizing is accomplished by means of tube 36, passageway 37 in body 11 and conduit 38 affording connection to solenoid vent valve 39 which controls high pressure air from the interior of tubular extension 21. The solenoid vent valve normally connects via conduit 40 and passageway 41 in valve body 11 to the interior of the tubular extension 21 and hence the high pressure bottle 22. Valve member 32 is opened only when solenoid vent valve is operated or energized to vent the underside of valve member 32 to atmosphere, as shown by the arrow in FIG. 1. Deenergization of solenoid vent valve puts high pressure air under valve member 32 and hence the valve closes, aided by spring 33, under this heavy closing pressure. Remote and rapid control of the shut-off valve giving high capacity flow is thus provided.

The arrangement of the tubing and the passages in body permit control of the shut-off valve in the present compact structure independently of the structure of the pressure regulator except for the body element so that the parts of regulator can be removed and repaired as will be explained. It is to be noted that the moving aluminum valve element rides in a steel cylinder with an O-ring seal. Since the moving aluminum element will be reduced in size by cooling more rapidly than the constraining cylinder, no binding will result.

Air which passes through the shut-off valve flows through the short passage 17 in body 11 into annulus 50 formed in part by the inner cylindrical wall of bore 12 in body 11. From annulus 50, some air passes through passage 51 in the upper part of the closure wall 52 and conduit 53 to a pressure reducer 54 (shown schematically) and then through conduit 55 and axial passage 56 in the closure wall to back of actuating piston of the spool-shaped device. This device slides in the annular steel sleeve 57 which has four equi-spaced circular openings 58 providing communication with annulus 50.

The aluminum spool-shaped device has three basic parts, the actuating piston 60 having outwardly-facing cavity 61, a reduced central part or intermediate shank 62 and valve piston member 63 at the forward end. This device also has a three-legged guide spider 64 intermediately located on shank and forwardly of the openings in the intermediate part of the sleeve. Air flows through the spaces between the legs of the spider 64 to the valve piston 63. The outer part or section of valve piston 63, riding in sleeve 57 and providing continuous peripheral surface, prevents air from passing from the interior of sleeve to the passage of outlet member 65 when the pressure in the outlet member exceeds a predetermined value. Air passes valve member 63 via four deep inwardly-flared and elongated slots 66 (FIG. 2) when member 63 is urged to the right. Each of the equi-spaced slots 66 is of uniform depth which is about two-thirds of the radius of the bore of sleeve 57. Each of these slots has a length substantially equal to its depth and the flared part is rounded for one third the length of the slot so that the very narrow part extends for two-thirds of the length of the slots.

Spring 68 positioned by a ledge in the transverse wall of the outlet member and a recess 69 in the valve member urges the piston assembly against closure wall 52 and opposes the movement of spool-shaped piston assembly when urged to the right by the pressure over the back of piston 60. Since the forces exerted on the inner surfaces of each end of piston means are equal, adjustment of pressure reducer 54 and spring 68 provide for a predetermined pressure in the outlet passage. It is to be noted that the outlet member 65 has a large inner tubular section and a smaller outer tubular section and that the larger section has a diameter appreciably larger than the diameter of the sleeve interior. Thus, the right end of the valve piston will abut the transverse wall between the two sections of the outlet member if moved to the extreme right. A bleed passage 72 having restricted duct 73 of very small diameter extends through the axial center of piston assembly in order to provide uniform operation. It is to be noted that an aluminum piston assembly slides in steel sleeve 57 so that, upon cooling of the piston assembly due to expansion of air, no binding will result. The O-ring in the periphery of actuating piston 60 maintains the seal under these conditions.

Closure wall 52 has an annular reduced part which slides into bore 12 of body 11 and a cylindrical recess which slidably receives the left end of the sleeve 57. Sleeve 57 has an outwardly-projecting shoulder which, at its inner side, abuts the right end of body 11 when the sleeve is slidably received in bore 14 of the body and the cylindrical recess of the closure wall 52. Tubular outlet 65 is slidably received over the right outer surface of the sleeve 57 until abutment with the shoulder of the sleeve occurs. With this construction which is held together by bolts passing through the corners of the rectangular cross-sections of the tubular outlet member, the body element, and the closure wall as seen from either end, it is apparent that the elements above the shut-off valve can be removed from the body element for repair while the shut-off valve remains closed.

The operation of the valve system including the shut-off valve and the constant pressure regulator is believed to be apparent from the foregoing description and the drawing. Thus, when shut-off valve poppet 32 is rapidly opened and provides a high capacity flow as above described, high pressure gas (initially at 3000 p.s.i.g.) from the tank is ported from annulus 50 to pressure reducer 54 and by openings in sleeve 57 uniformly into the space around the shank 62 of piston assembly. The piston assembly initially remains in the position shown on the drawing by return spring 68 since the inner areas of piston assembly affected by the high pressure are equal. The reducer 54 almost instantly supplies controlled pressure (about 350 p.s.i.g.) to the control piston cavity 61 forcing the piston assembly to the right against spring 68. As the piston assembly moves to the right, the inwardly-flared elongated slots 66 are uncovered, allowing a rapid flow of high pressure gas into the interior of air outlet member 65. As the pressure in this space approaches the magnitude of the control pressure applied to the left side of the piston assembly, the piston assembly slows down. When the output pressure (about 300 p.s.i.g.) in outlet member 65, bolstered by the force of spring 68, exceeds the force created by the control pressure on the left end of the piston assembly, motion of the piston assembly in the opposite direction occurs. This action reduces the opening of slots 66 and reduces the output pressure. This entire action is so rapid that the oscillating piston assembly, due to its inherent inertia, seems to assume one postion which is only altered as the inlet pressure drops in accordance with the pressure in an air bottle. The flared part of the slots provide suitable pressure reduction as the inlet pressure drops. Uniform operation of the pressure regulator is assured by bleeding its output through the restricted duct 73 and passage 72 extending through the shank 62 of the piston assembly. This serves to prevent overshoots of pressure.

A high capacity gas flow at a constant controlled pressure through the outlet member 65 is thus provided. If the piston assembly overshoots due to malfunction or if the line downstream of outlet member 65 breaks, the valve end 63 of the piston assembly then approaches or contacts the inner transverse end wall or safety valve seat of outlet member 65 and reduces or shuts off the flow of gas.

From the foregoing, it is apparent that a compact valve assembly which is adapted for connection to a high pressure tank by means of a single fitting is provided. Vertical flow through the shut-off valve to the pressure regulator on a horizontal axis is compactly provided by the annulus and associated structure. This compact construction provides rapid on-off flow with control from a remote source and constant pressure regulation during the brief time air is delivered. The arrangement of the poppet valve, its guide, the kidney-shaped recess and associated structure provide a rapidly operated high flow shut-off valve which is remotely controlled. Because the shut-off valve functions are separated structurally from the pressure control valve functions, it is possible to remove and repair the pressure control valve elements when the entire assembly is mounted on a loaded high pressure bottle.

It is to be understood that changes can be made in the disclosed embodiment without departing from the invention as defined by the following claims.

What is claimed is:

1. An on-off valve assembly comprised of a body means arranged on vertical axis and having an annular valve seat which is rectangular in axial cross section, a cylindrical poppet having a rounded head of such diameter and so positioned as to contact the circular inner edge of said valve seat slightly interiorly of the edge of said rounded head whereby a valve is formed, said poppet and said seat providing a narrow annular space at the bottom of the inner edge of said valve seat and the peripheral top of said poppet so that high pressure gas can exert an opening force on the peripheral top of said poppet, a tubular valve guide, said poppet being slidably mounted in said guide, said valve guide having gas passage means communicating with said space, gas inlet means extending around and beyond said valve guide for passing high pressure gas to said passage means and adapted to be connected to a high pressure source, control means including a control valve connected to the bottom of said valve guide for admitting gas from said gas inlet means to a space under said poppet for closing said valve and for venting gas from said space whereby rapid opening of said valve due to said opening force is possible; and said passage means including a relatively large kidney-shaped recess facing the side of said poppet and so located that the wide part of said recess is at the level of the edge of said rounded head of said poppet when said poppet is in open position.

2. An on-off valve assembly comprised of a body means arranged on vertical axis and having an annular valve seat which is rectangular in axial cross section, a cylindrical poppet having a rounded head of such diameter and so positioned as to contact the circular inner bottom edge of said valve seat slightly interiorly of the edge of said rounded head whereby a valve is formed, said poppet and said seat providing a narrow annular space at the bottom of the inner edge of said valve seat and the peripheral top of said poppet so that high pressure gas can exert an opening force on the peripheral top of said poppet, said poppet having a cylindrical side wall extending down from the edge of said rounded head, a tubular valve guide having a cylindrical cavity with a bottom wall, said poppet being slidably mounted in said cavity, a spring within said poppet contacting the bottom wall of said tubular valve guide, said spring urging said poppet against said seat, said valve guide having an upper annular wall abutting said valve seat, said upper guide wall being so constructed adjacent said valve seat as to provide with said poppet an annular passage to said space, said upper guide wall having gas passage means communicating with said space, gas inlet means extending around and beyond said valve guide for passing high pressure gas to said passage means and adapted to be connected to a high pressure source, control means including a control valve connected to the bottom of said valve guide for admitting gas from said gas inlet means to a space under said poppet for closing said valve and for venting gas from said space whereby rapid opening of said valve due to said opening force is possible, and said passage means having a relatively large kidney-shaped recess facing the side of said poppet and so located that the wide part of said recess is at the level of the edge of said rounded head of said poppet when said poppet is in open position.

References Cited in the file of this patent

UNITED STATES PATENTS

| | | |
|---|---|---|
| 334,326 | Acheson | Jan. 12, 1886 |
| 624,890 | Batchelor | May 9, 1899 |
| 824,658 | Junggren | June 26, 1906 |
| 971,982 | Ford | Oct. 4, 1910 |
| 1,141,114 | Henderson | June 1, 1915 |
| 1,660,842 | Hoesel | Feb. 28, 1928 |
| 2,085,893 | Boland | July 6, 1937 |

FOREIGN PATENTS

| | | |
|---|---|---|
| 71,256 | Germany | of 1893 |
| 486,973 | France | Feb. 28, 1918 |
| 26,222 | Germany | Feb. 16, 1956 |